Figure 1:
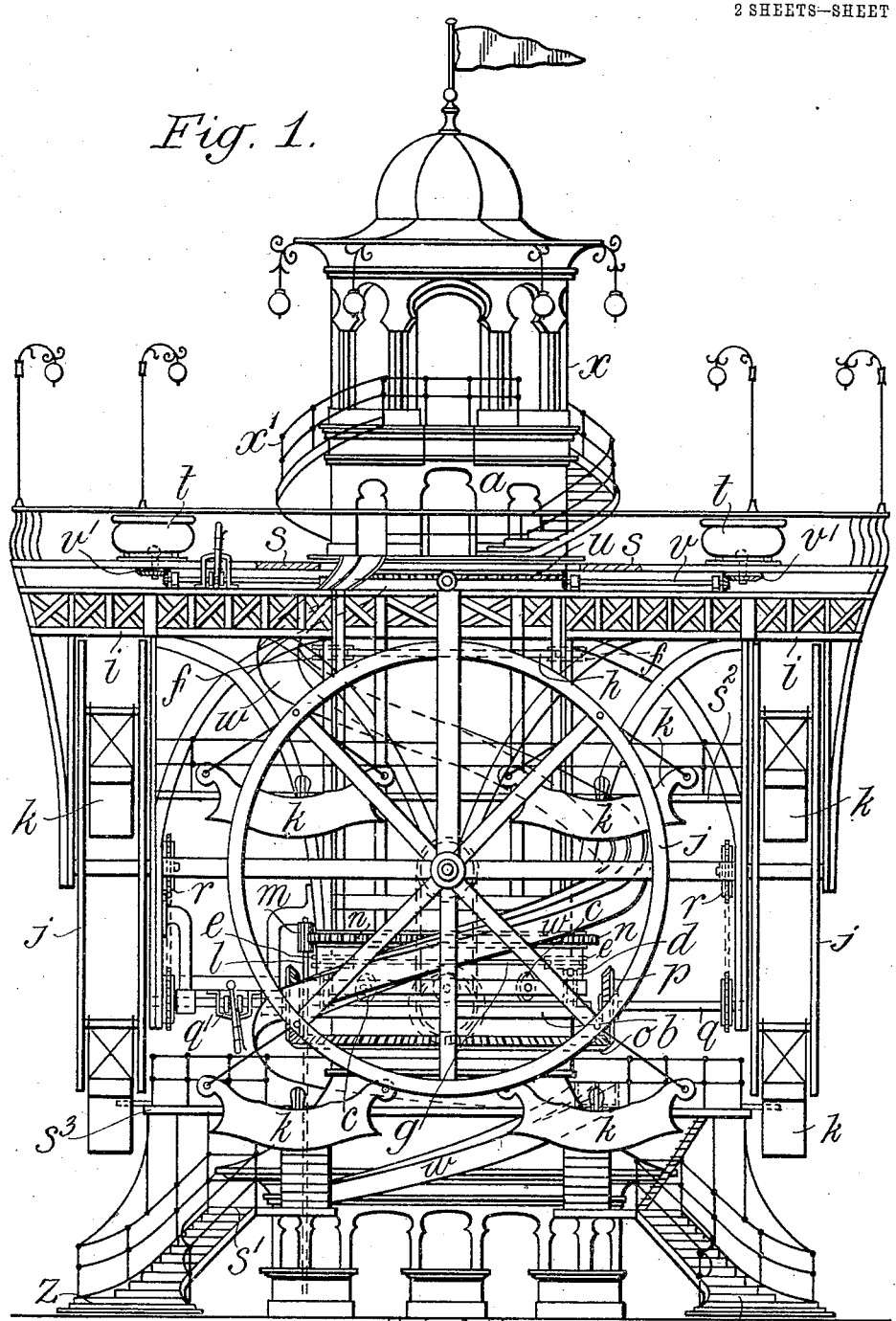

T. W. POTTS & A. W. LOVELL.
AMUSEMENT DEVICE.
APPLICATION FILED MAR. 25, 1908.

932,057.

Patented Aug. 24, 1909.
2 SHEETS—SHEET 1.

UNITED STATES PATENT OFFICE.

THOMAS WILLIAM POTTS AND ALFRED WADSWORTH LOVELL, OF LONDON, ENGLAND.

AMUSEMENT DEVICE.

932,057.  Specification of Letters Patent.  Patented Aug. 24, 1909.

Application filed March 25, 1908. Serial No. 423,209.

*To all whom it may concern:*

Be it known that we, THOMAS WILLIAM POTTS and ALFRED WADSWORTH LOVELL, subjects of the King of Great Britain and Ireland, residing at 34 Norfolk street, in the county of London, England, have invented certain new and useful Improvements in Amusement Devices; and we do hereby declare the following to be a full, clear, and exact description of the invention, such as will enable others skilled in the art to which it appertains to make and use the same.

This invention for improvements in revolving aerial machines for recreation and amusement has for its object to provide in a single machine various amusement apparatus of the revolving type, and comprises a central fixed tower with means for gaining access thereto, a series of revolving wheels with suspended cars mounted to revolve around the tower and also about their own axes, and a series of centrifugal platforms geared to the fixed central tower and mounted to rotate about independent axes on the main platform.

In the preferred embodiment of our invention we provide a fixed tower constructed of steel work timber or other material and provided with lifts. Around this tower at any convenient height from the ground is fixed a roller path on which a drum or barrel is mounted to revolve on vertical rollers. Cantalivers are supported on the drum, and wheels with cars are suspended from the cantalivers. On the top of the cantalivers are girders or other supporting members carrying the deck or platform. The top of the tower is provided with exits from the lift and is surmounted by a fixed band stand or pavilion.

On the barrel or drum just above the roller path are a series of horizontal rollers which travel around a rail fixed to the tower and a similar set of rollers is located at the top of the tower just below or within the platform.

The drum carrying the deck and wheels is driven around the fixed tower and the wheels made to revolve simultaneously on their own axles.

Suitable clutches are arranged in the transmission gear between the drum and wheels so that the motion of the wheels around their own axles may be arrested to enable passengers to enter and leave the carriages.

On the top of the main platform seats are fixed and in addition a number of independent revolving platforms are provided with seats so arranged that the occupants are prevented from being thrown off by centrifugal action. The centrifugal platforms are carried around with the main platform and caused to revolve about their own axes by a stationary gear wheel on the tower gearing with pinions on the platform.

The whole apparatus is driven and controlled by suitable machinery located at or about the ground level.

Figure 2:
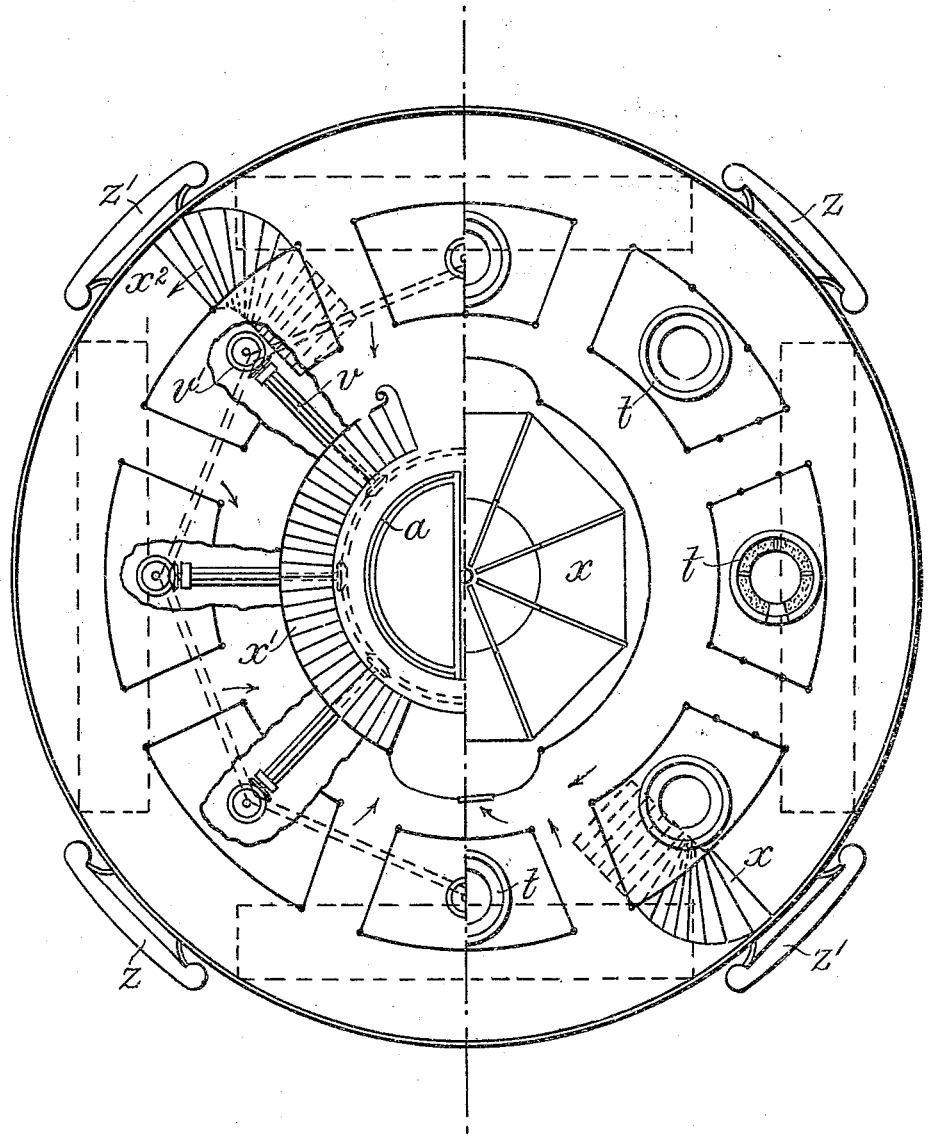

In the accompanying sheet of illustrative drawings Figure 1 is an elevation of a revolving machine constructed according to this invention and Fig. 2 is a plan of the same partly in section.

The central tower $a$ which forms the fixed part of the superstructure is of any suitable construction and is provided with a roller track or bearing $b$ on which run the vertical supporting rollers $c$ of the revolving drum $d$. Sets of horizontal guide rollers $e\ f$ are also mounted on the drum and run on rails $g\ h$ fixed to the central tower to take the lateral thrust of the drum. Cantalivers $i$ are carried by the drum $d$ and support revolving wheels $j$ having cars $k$ suspended therefrom. The drum $d$ is driven through a vertical shaft $l$ and spur pinion $m$ which gears with a circular rack $n$ on the drum. As the drum revolves motion is transmitted to the wheels $j$ by a circular bevel gear $o$ on the tower $a$ which gears with bevel wheels $p$ mounted on shafts $q$ fitted with clutches $q'$ and operatively connected with the axles of their respective wheels $j$ by sprocket gear $r$.

Above the cantalivers $i$ the main platform $s$ is supported which is provided with fixed and revolving seats. The revolving seats or lounges $t$ are circular and as they travel around with the main platform are rotated about their axes by a fixed gear $u$ on the central tower $a$ through shafts $v$ and bevel gear $v'$.

As shown a double inclined spiral slideway $w$ is fixed around the revolving drum in helical form and leads from the main platform $s$ to a landing platform $s'$ near the base of the structure. Another platform $s^2$ is provided which forms a loading platform for the carriages of the revolving wheels $j$, which unload at the platform $s^3$.

At the top of the central tower $a$ a covered band stand or pavilion $x$ is constructed with stairways $x'$ leading down to the main platform. Stairways $x^2$ also connect the different platforms.

Entrances to the lifts are provided at the various platform levels and an exit $y$ is provided at the bottom.

The main entrance is up one of the diametrically opposed stairways $z$ similar stairways $z'$ being provided for exit from the landing platform $s'$. Passengers may thus ascend by the lifts and descend by the same method or they may ascend by the revolving wheels and descend in the same way or by the lifts or the spiral slideway. The landings are preferably separated from each other by suitable partitions so that passengers having descended can only pass to the exit.

What we claim and desire to secure by Letters Patent is:—

1. An amusement device comprising in combination, a central stationary tower, a drum mounted to revolve about said tower and being longitudinally immovable with respect thereto, a plurality of superposed platforms mounted on said drum to revolve therewith about said tower, a series of revolving wheels mounted on said drum to rotate bodily therewith and also axially, one of said platforms being so disposed with respect to said wheels and cars as to serve as an unloading station therefor.

2. An amusement device comprising in combination, a central stationary tower, a drum mounted to revolve about said tower and being longitudinally immovable with respect thereto, a plurality of superposed platforms mounted on said drum to revolve therewith and about said tower, a series of revolving wheels mounted on said drum to rotate bodily therewith and also axially, one of said platforms being so disposed with respect to said wheels and cars as to serve as an unloading station for the latter, and a stationary platform disposed with respect to said wheels and cars so as to serve as a loading station therefor.

3. An amusement device comprising in combination, a central stationary tower, a drum mounted to revolve about said tower and being longitudinally immovable with respect thereto, a platform mounted on said drum to revolve therewith about said tower, and a series of revolving wheels mounted on said drum to rotate bodily therewith and also axially, cars for said wheels, said platform being located with respect to said cars and wheels so as to serve as an unloading station for the latter.

4. An amusement device comprising in combination, a central stationary tower, a drum mounted to revolve about said tower and being longitudinally immovable with respect thereto, a series of wheels mounted on said drum to rotate bodily therewith and also axially, cars for said wheels, and a platform mounted to rotate with said drum about said tower and disposed with respect to said wheels and cars so as to afford ingress to and egress therefrom.

5. An amusement device comprising in combination, a central stationary tower, a drum mounted to revolve about said tower and being longitudinally immovable with respect thereto, a series of wheels mounted on said drum to rotate bodily therewith and also axially, cars for said wheels, a platform mounted on said drum to rotate therewith about said tower and disposed with respect to said wheels in a manner to serve as an unloading station when the cars are in an uppermost position, and a stationary platform mounted on said tower and disposed with respect to said cars in a manner to serve as a loading station when the cars are in a lowermost position.

6. An amusement device comprising in combination, a central stationary tower, a drum mounted to revolve about said tower, a series of wheels mounted on said drum to revolve therewith about said tower bodily and also axially, cars for said wheels, a platform mounted on said drum to revolve therewith about said tower and disposed with respect to said cars in a manner to form an unloading station therefor, and means for causing one of said wheels to remain in a position of rest during rotation of said drum.

7. An amusement device comprising in combination, a central stationary tower, a circular rack secured to said tower, a drum revolubly mounted on said tower, a series of wheels revolubly mounted on said drum to rotate bodily therewith and also axially, gearing means operatively connecting said wheels with said rack to axially rotate the wheels during rotation of said drums, means for throwing said wheels into or out of operative relation with said rack, cars for said wheels, a platform on said drum disposed with respect to said cars so as to serve as a loading or unloading station therefor, and a stationary platform disposed with respect to said cars to form a loading or unloading station therefor.

8. An amusement device comprising in combination, a central stationary tower, a drum revolubly mounted on said tower and provided with a series of wheels adapted to rotate bodily with said drum and also axially, cars for said wheels, means for axially rotating said wheels, mechanism for throwing one of said wheels into or out of driving relation, a platform mounted on said drum to rotate therewith and disposed with respect to said cars so as to form a loading or unloading station therefor.

9. An amusement device comprising in combination, a central stationary tower, a drum revolubly mounted on said tower, means for continuously rotating said drum about said tower, a series of wheels mounted on said drum to rotate therewith bodily, cars for said wheels, a platform for said drum disposed with respect to said cars so as to form a loading or unloading station therefor, mechanism for axially rotating said wheels, and a device for throwing one of said wheels into and out of driving relation with said mechanism.

10. An amusement device comprising in combination, a central stationary tower, a stationary loading platform therefor, a drum revolubly mounted on said tower, means for continuously revolving said drum, wheels mounted on said drum to be rotated bodily therewith, cars for said wheels adapted in their lowermost position to lie adjacent said stationary platform for loading purposes, a platform mounted on said drum and revolving about said tower therewith and serving as an unloading station for said cars when in an uppermost position, means for continuously revolving said drum, mechanism for axially revolving said wheels, a device for throwing one of said wheels into and out of driving relation with said mechanism, a second platform mounted on said drum, a plurality of revoluble seats on said second platform, means for effecting axial rotation of said seats, and an inclined spiral slideway having its intake end adjacent said second platform and its outlet end below said stationary platform.

11. An amusement device comprising in combination, a central stationary tower, a stationary tower platform at the foot thereof, a pavilion at the upper end of said tower, lifts running from the bottom thereof to said pavilion, a drum revolubly mounted on said tower, means for continuously revolving said drum, wheels mounted on said drum to revolve therewith bodily, cars for said wheels lying adjacent said stationary platform when in their lowermost position, mechanism for axially revolving said wheels, a device for throwing one of said wheels into and out of driving relation with said mechanism, a platform for said drum disposed adjacent said cars when in their uppermost position, a platform for said drum located above said wheels, revoluble seats on said latter platform, and an inclined spiral slideway having its intake end adjacent the latter platform and its outlet end at the foot of said tower.

In testimony whereof we have affixed our signatures, in presence of two witnesses.

THOMAS WILLIAM POTTS.
ALFRED WADSWORTH LOVELL.

Witnesses:
JOHN W. MACKENZIE,
ALBERT JONES.